United States Patent Office 2,737,347
Patented Mar. 6, 1956

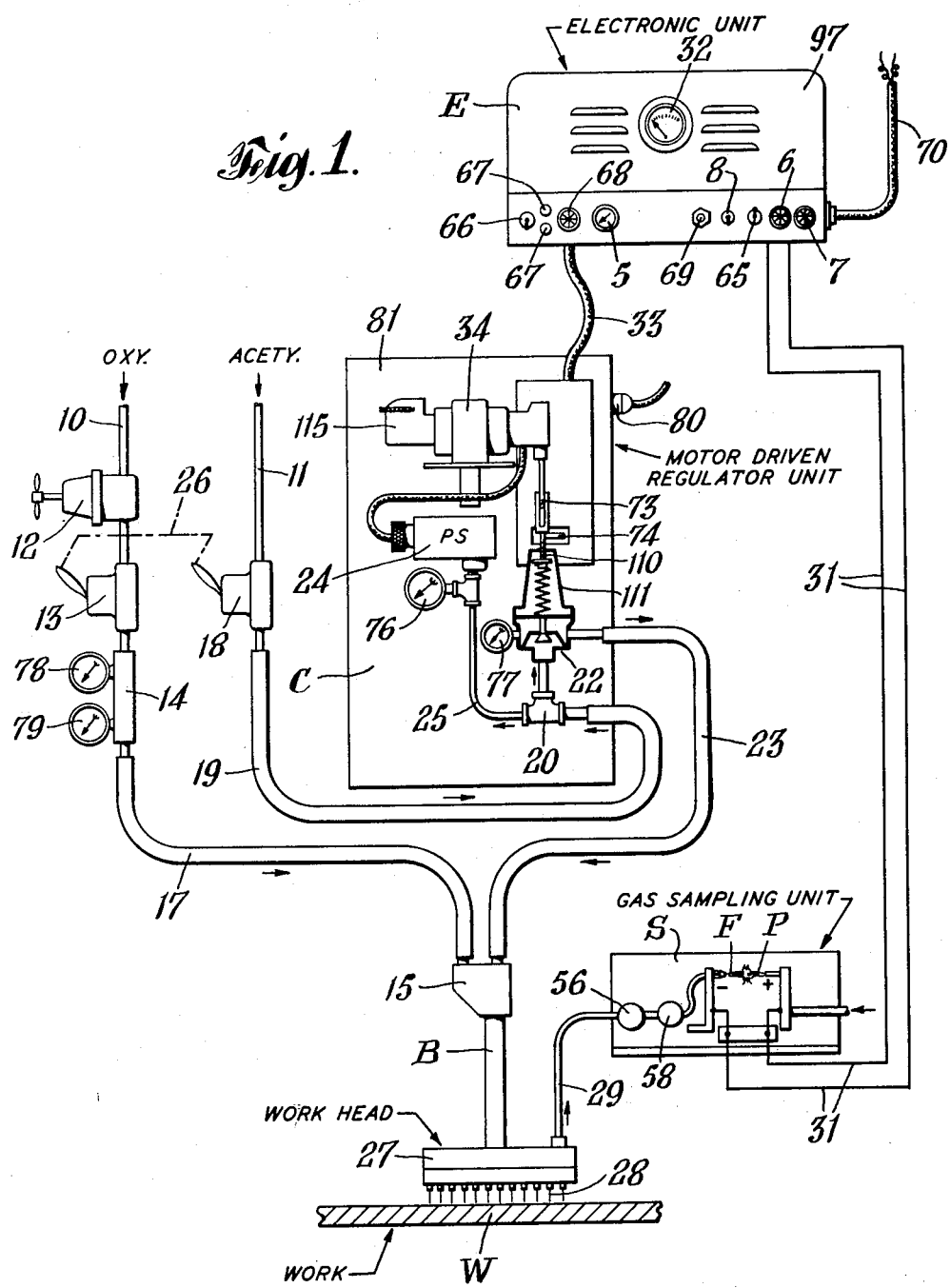

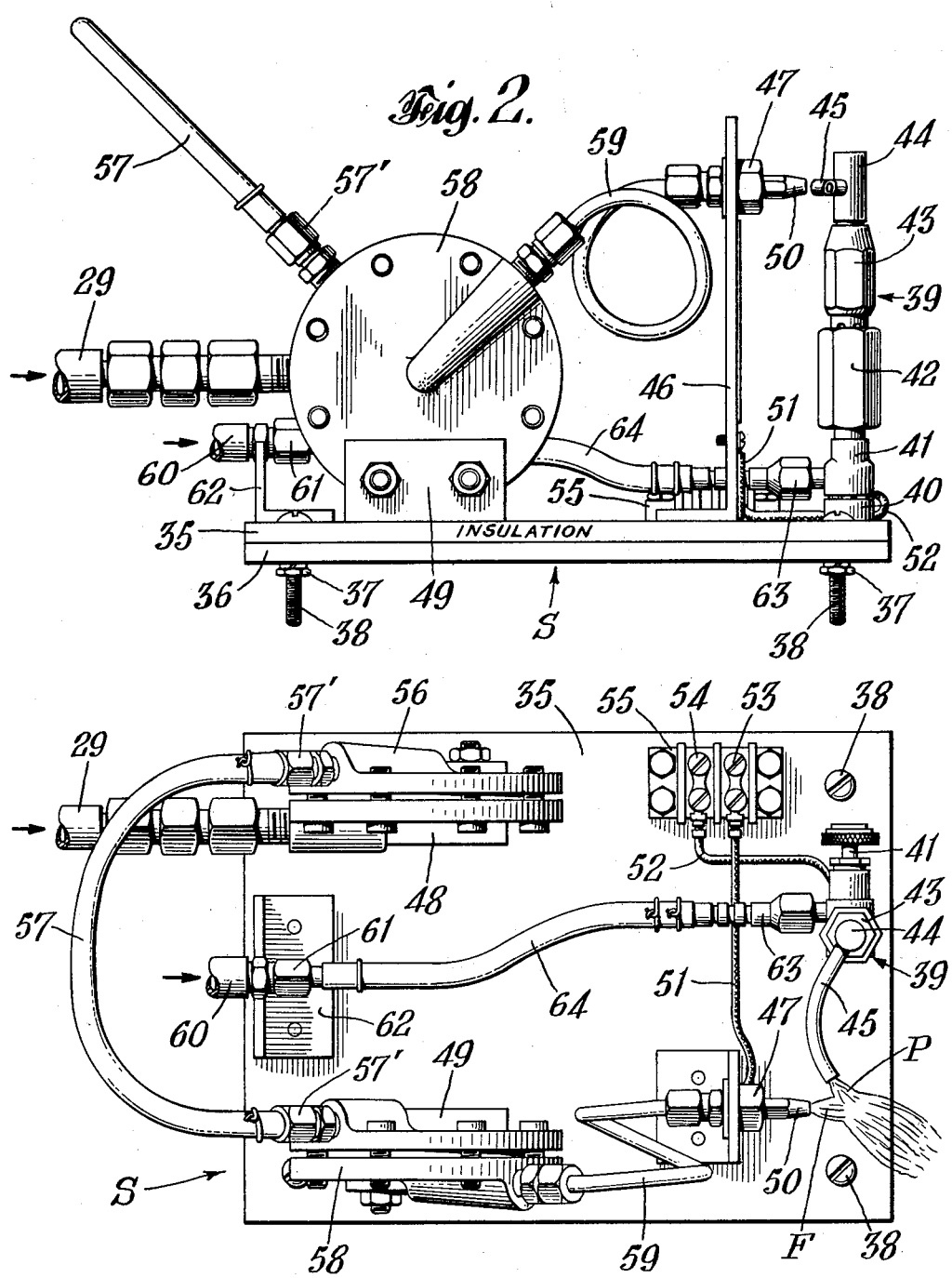

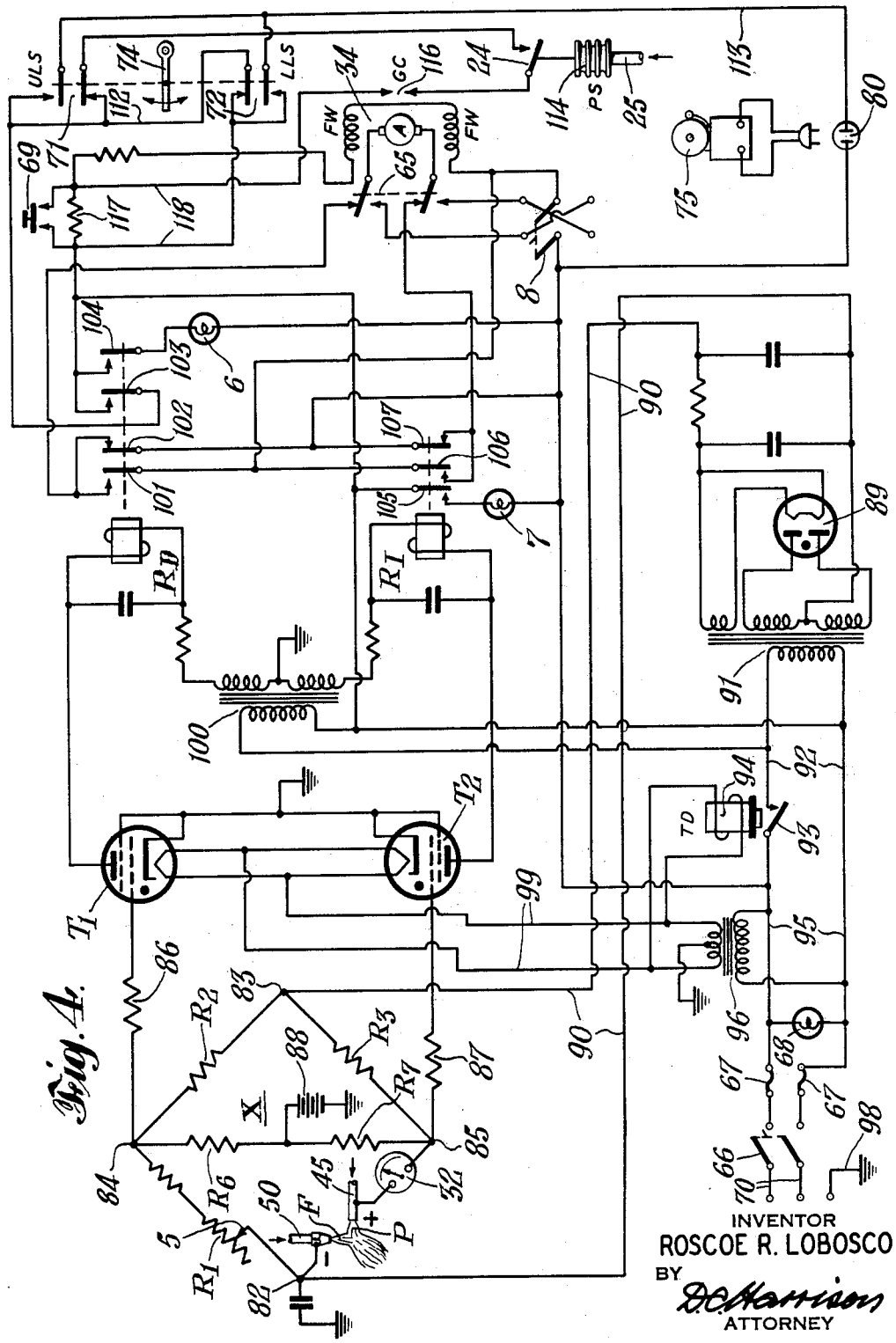

2,737,347

AUTOMATIC GAS RATIO CONTROL SYSTEM

Roscoe R. Lobosco, Fanwood, N. J., assignor to Union Carbide and Carbon Corporation, a corporation of New York Original application August 1, 1947, Serial No. 765,551, now Patent No. 2,622,967, dated December 23, 1952. Divided and this application March 7, 1952, Serial No. 275,291

7 Claims. (Cl. 236—15)

This invention relates to automatic gas ratio control systems, and more particularly to such systems in which the operation for controlling the gas ratio depends on the electrical conductivity of a flame supplied by a sample stream of gas composed of a mixture of oxygen and fuel gas the ratio of which is to be controlled.

The present application is a division of my application Serial No. 765,551, filed August 1, 1947, for "Automatic Gas Ratio Control Means," now Patent No. 2,622,967, dated December 23, 1952.

The main object of the invention is to provide an improved automatic gas ratio control system that is relatively simple and economical in its parts and one which also is safe, efficient, accurate and reliable in use. Another object is to provide a sensitive apparatus for varying one component of a combustible mixture to obtain reproducible results and maintain the ratio of fuel to oxidizing gases substantially constant. Other objects will appear in the following description.

In the drawings:

Fig. 1 is a view mainly in elevation of an automatic gas ratio control system illustrating the invention;

Fig. 2 is an enlarged view in elevation of the gas sampling unit or head;

Fig. 3 is a top plan view of such unit with the pilot flame and mixed gas flame burning; and Fig. 4 is a circuit diagram of the system.

The illustrated system comprises a commercially pure oxygen gas supply line 10 and an acetylene fuel gas supply line 11 which are connected, respectively, to suitable sources of supply of such gases under pressure. The oxygen gas supply line 10 contains an adjustable oxygen gas pressure regulator 12, a quick-acting shut-off valve 13, and a critical orifice meter 14; insuring a constant flow of oxygen at a desired pressure to an oxy-fuel gas mixer 15 of a blowpipe B to which mixer the outlet of the meter 14 is connected by a flexible hose 17. The critical flow meter operates not only to measure the flow of oxygen but also maintains that flow substantially constant regardless of changing pressure conditions at the mixer and blowpipe, so long as the input pressure of gas supplied to the critical orifice meter is maintained constant.

The acetylene fuel gas supply line 11 contains a quick-acting shut-off valve 18, the outlet of which is connected by a flexible hose 19 to a T-fitting 20 on a motor driven valve or regulator unit C. One outlet of the T-fitting conducts the fuel gas to a motor-driven fuel gas throttle valve such as a pressure regulator 22 which is connected to the mixer 15 by a flexible hose 23. The other outlet of the T-fitting is connected to a gas pressure responsive switch 24 by a pipe 25. The handles of the quick-acting shut-off valves 13 and 18 are connected to each other by a link 26 for mutual operation.

The oxy-fuel gas blowpipe B is provided with a work head or main burner 27 to the internal mixed gas chamber of which a combustible mixture of oxygen and acetylene are delivered for supplying oxy-acetylene flames 28 which impinge on work W. A conduit 29 is connected to the work head 27 for conducting a sample stream of the mixed gases to a gas sampling unit S. The conduit may consist of a length of copper tubing or a length of flexible hose or both.

The gas sampling unit S, which is described in detail below, is electrically connected by a circuit 31 to an electronic unit E, which is in turn electrically connected by an electric cord or cable 33 to the motor driven regulator unit C, so that any change in the gas ratio of the mixture supplied to the gas sampling unit S is indicated by a meter 32, and causes the electronic unit E automatically to operate a motor 34 to adjust the acetylene pressure regulator 22 and, thus, automatically restore the oxygen-acetylene gas ratio to the selected value.

From the foregoing it will be apparent that the system comprises three principal components, i. e., the gas sampling head or unit S, the electronic control unit E, and the motor driven valve or regulator unit C. The gas sampling unit S is shown more clearly in Figs. 2 and 3. Such unit comprises an electrically non-conductive panel 35 mounted on a base 36. These parts are held together by four bolts 37 located near the corners of the panel, providing dependent machine screws 38 for attachment to any suitable support. Mounted on the panel 35 is a pilot flame burner or tip 39 composed of metal and which includes a mounting block 40, a needle valve assembly 41, a valve adapter 42, an air gas mixer 43, and a pilot light connection 44 supporting a curved tip 45 composed of copper tubing which is disposed to direct its air-acetylene flame P horizontally.

Also mounted on the insulating panel 35 is a metal bracket 46 near the top of which is supported a mixed-gas flame tip fitting 47 also composed of metal. The bracket 46 and fitting 47 are positioned so that a mixed-gas flame burner or tip 50 directs a mixed gas sampling flame F in the same horizontal plane as that of the pilot flame P and in a direction forming an included angle of slightly less than 90° with the flame P.

The panel 35 serves to electrically insulate the tips 45 and 50, both of which are composed of metal, from each other; and a direct current electrical circuit to the flames F and P is established by insulated conductors 51 and 52, the ends of which are connected to the bracket 46 and mounting block 40, respectively, and to terminals 53 and 54 of an insulating strip 55 which is mounted on the panel 35. The terminals 53 and 54 are also connected to the input circuit 31 of the electronic unit E.

When the gas sampling tip 50 is the positive electrode of the gas sampling head, the flame resistance is fairly low, and the flame resistance is not an accurate measure of the gas ratio. However, when the gas sampling tip 50 is made the negative electrode of the gas sampling head, then the flame resistance is high, and such flame resistance is an accurate measure of the gas ratio. Therefore, in the gas sampling head S the gas sampling tip 50 is made the negative electrode with respect to the pilot flame tip 45 which is positive in the direct current circuit 31.

The combustible mixture of oxygen and acetylene which is delivered to the gas sampling unit S by the conduit 29 is conducted to the tip 50 through a filter type flash arrestor 56, a length of electrically insulating flexible transparent plastic tubing 57, a filter type flash arrestor 58, a length of copper tubing 59, and the fitting 47. The flash arrestors are mounted on the panel 35 by brackets 48 and 49. The tubing 57 serves to electrically insulate the flash arrestor 56 from the flash arrestor 58 and copper tubing 59 which leads to the burner fitting 47.

In some cases the flash arrestor 58 can be omitted without departing from the invention.

Commercially pure fuel gas, in this case acetylene, is conducted to the gas sampling unit S by a hose 60 which is connected to a fitting 61 mounted on a bracket 62 which is connected to the base panel 35. The acetylene is conducted from the fitting 61 to an inlet fitting 63 of the gas burner 39 by a length 64 of flexible transparent plastic tubing. Such tubing 64 serves to electrically insulate the gas burner 39 from the gas supply hose 60.

As pointed out above, in the gas sampling head or unit S, a sample of the mixed gases is diverted from the blowpipe work head 27 and is burned upon discharge from the gas sampling tip 50. The constant ratio air-acetylene flame P intersects the mixed-gas sampling flame F at an included angle of slightly less than 90°, so as to keep ignited the mixed-gases discharged by the tip 50, and prevent the flame F from blowing out or off. Both the mixed-gas sampling tip 50 and pilot flame tip 45 are electrically insulated from each other and from ground. The terminal block or strip 55 provides means for electrically connecting such otherwise mutually electrically insulated tips 45 and 50 to the electronic unit E by way of the direct current circuit 31.

The electronic control unit E (Fig. 1) measures the conductivity of the flame F burning off the gas sampling head tip 50 and compares it with a desired conductivity. If the oxy-acetylene gas ratio of the flame F is higher or lower than the desired ratio, the electronic unit E automatically operates the motor driven acetylene regulator 22 in the proper direction to correct the error.

The electronic unit E is equipped with a gas ratio selecting knob 5, the ratio indicating meter 32, a pair of acetylene panel lights 6 and 7 to indicate when a correction is being made, a manual-automatic switch 8 so that the control can be obtained either automatically or manually, and an increase-decrease acetylene switch 65, a master switch 66 for turning the unit E on and off, a pair of protective fuses 67, and an on-off panel light 68 to indicate when the power is turned on, and a high speed push-button switch 69 for selectively operating the motor 34 at full speed without disturbing the normal governor setting of such motor.

The electronic unit E is protected by a suitable housing and is provided with an electrical power input cord or cable 70 and the power output cable 33, the latter being connected to the motor driven regulator unit C.

In the motor driven regulator unit C the reversible motor 34 is provided to adjust the acetylene valve or regulator 22 automatically in accordance with a signal from the electronic control unit E. The regulator unit C is equipped with two limit switches 71 and 72 (Fig. 4) to prevent overtravel of the regulator adjusting screw connection 73 when the electronic unit E is operating automatically, and with the pressure switch 24 which automatically starts the operation of the system each time the gases are supplied to the work head 27.

When either limit switch 71 or 72 is actuated through a hinged arm 74 by overtravel of the regulator-motor connection 73, an alarm signal 75 is energized, thus warning the operator that the regulator 22 is beyond its normal range of operation.

The regulator unit C also is equipped, as shown in Fig. 1, with a fuel-gas inlet pressure gauge 76 and a fuel gas outlet pressure gauge 77. As shown in Fig. 1 the regulator motor controls the stress in the regulator diaphragm spring, changing the stress in this spring when a change in fuel gas is needed to maintain the desired ratio of fuel to oxidizing gases. Having one of the gaseous mixture components maintained at a fixed rate of flow while adjusting the flow of the other component in response to changes in resistance of a flame supported by said mixture as described, has been found preferable to striving to maintain the desired ratio by changing both components. Also adjustment of flow of one component by a single valve as illustrated, in response to both pressure and flame resistance is preferable to the use of two valves one responsive to pressure and the other responsive to flame resistance. If desired, where a large flow of fuel gas or acetylene is required, a pilot operated regulator may be substituted for the regulator 22, in which case the pilot unit is connected to the motor 34.

The critical orifice flow meter 14 in the oxygen supply line is provided with oxygen inlet and outlet pressure gauges 78 and 79.

A receptacle 80 for the alarm signal 75 is provided on the motor driven regulator panel 81. The alarm signal 75 can be any suitable bell, horn, light, and can be located in any desired position.

A circuit diagram illustrating the entire system is shown in detail in Fig. 4. The electronic control unit E includes a Wheatstone bridge X, two arms of which consist of equal resistances $R_2$ and $R_3$, and the other two arms of which consist of an adjustable resistance $R_1$ and variable resistance, respectively, the variable resistance comprising the mixed gas flame F composed of the mixture of oxygen and fuel gas the ratio of which is to be controlled. The arm of the bridge containing such flame F constitutes the input circuit 31 of the control unit and contains, in series circuit relation, the ammeter 32, the pilot flame tip 45, the pilot flame P, the mixed gas flame F, and the mixed gas flame tip 50. The bridge circuit described has two pairs of substantially equal resistance arms. However, any modifications of the bridge circuit are within the scope of the invention and the pairs of arms can bear any desired ratio to each other.

The electrical conductivity of the oxy-fuel gas flame F varies with the oxygen to fuel gas ratio when the potential of tip 50 is negative with respect to that of the tip 45. A highly carburizing flame has a relatively low conductivity, and the flame conductivity increases as the oxygen to acetylene ratio increases, until a maximum conductivity is reached beyond which the conductivity begins to decrease. The directional characteristic of the mixed gas flame is highly important, i. e., the potential of the pilot flame P must be positive and that of the mixed-gas flame must be negative for satisfactory operation of the system.

The conductivity versus oxy-acetylene ratio characteristic is consistent and accurate with the proper polarity selection. The electrical conductivity of the flame F is used in the system to indicate and control its ratio. In the present modification a small part of the mixed gases is diverted from the work head 27 and burned in the insulated tip 50 which is part of the gas sampling head S. If desired, the gases supplying the tip 50 can be diverted from the gas supply lines to the mixer 15, and mixed in the tip 50, without departing from the invention. The constant ratio air-acetylene pilot flame tip 45, which is also mounted on the gas sampling head S, directs its flame P so that the pilot flame P and mixed gas flame F mushroom on each other, as pointed out above. The pilot flame may be composed of oxygen and fuel gas, if desired, without departing from the invention; but an air-fuel gas flame is less expensive.

The measure of the conductivity of the flames P and F between such tips 45 and 50 indicates the ratio of the gases burning at the gas sampling tip 50 and the work head 27, since the same gas mixture is burned at both the work head and the gas sampling tip. The ammeter 32, which is connected in series with the flames, provides a direct indication of the gas flame conductivity. Such meter is calibrated in terms of gas ratio.

A constant voltage source is connected to opposite terminals 82 and 83 of the bridge X so that the same potential is applied to the adjustable and variable resistance arms thereof, and a pair of thyratrons $T_1$ and $T_2$ have their control grids, respectively, connected to the other terminals 84 and 85 of the bridge through current limiting resistors 86 and 87. A bias battery 88 is connected to the cathode-control grid circuit of the thyratrons by way of equal resistances $R_6$ and $R_7$ and the terminals 84 and 85 of the bridge X. Thus, one thyratron fires when the variable resistance of flame F rises above the adjustable resistance $R_1$, and the other thyratron fires when such variable resistance falls below the adjustable resistance $R_1$.

The constant voltage source connected to the terminals 82 and 83 of the bridge X consists of a full wave rectifier 89, the output circuit 90 of which is connected to such terminals 82 and 83; the input of the rectifier 89 being supplied by a transformer 91, the primary winding of which is connected to an alternating circuit 92 containing a normally open switch 93 of a time delay relay 94. The time delay relay 94 is energized from a circuit 95 through a transformer 96, the circuit 95 being provided with the fuses 67 and the signal light 68. The circuit 95 is connected to a suitable source of alternating current by the electrical cable 70 and the main power line or master switch 66. The metal casing or housing 97 of the electronic unit 32 is provided with a ground circuit 98.

When the switch 66 is closed, the signal lamp 68 lights and, after a suitable time delay, the relay 94 closes switch 93, resulting in the energization of rectifier 89 and the application of a constant source of direct current voltage to the terminals 82 and 83 of the bridge X. The time delay is provided to enable the filaments of the thyratrons $T_1$ and $T_2$ to be heated by electricity supplied through a circuit 99 connected to the secondary of the transformer 96 before applying grid and plate voltage to these tubes.

The output circuits of the thyratrons $T_1$ and $T_2$ include relays $R_D$ and $R_I$, power being supplied thereto from the A. C. circuit 92 through a transformer 100. The wiring arrangement is such that when thyratron $T_1$ fires, the relay $R_D$ is energized; and when the thyratron $T_2$ fires, the relay $R_I$ is energized. The relay $R_D$ is adapted to operate four switches 101, 102, 103 and 104, while the relay $R_I$ is adapted to operate three switches 105, 106, and 107. The arrangement is such that when the switches of the relay $R_D$ are moved from their normal position, the regulator driving motor 34, which includes an armature A and field windings FW, is driven in one direction; and when the switches of the relay $R_I$ are operated the motor is energized to operate in the reverse direction. It is believed that the circuit connections of Fig. 4 will be understood by those skilled in the art without any further detailed explanation thereof.

From the above it will be apparent that the gas sampling head S is connected to the electronic unit E which automatically compares the conductivity of the flame F of the gas sampling tip 50 with the conductivity of the standard resistor $R_1$ which is, in this case, the ratio selector rheostat comprising knob 5. The electronic unit E automatically acts to adjust and maintain the flame conductivity equal to that of the ratio selector rheostat. If the flame conductivity is higher than the desired value, the electronic unit causes one of the thyratron tubes to fire and energize its relay which, in turn, energizes the motor 34 of the motor driven regulator 22 in the direction which will correct the error.

If, on the other hand, the flame conductivity is lower than the desired value, the electronic unit E causes the other thyratron to fire and energize its relay which automatically makes the proper connections necessary to drive the motor driven regulator in the opposite direction to change the flow of fuel gas to correct this error. Thus, if the flame conductivity is higher or lower than the correct value, the electronic unit automatically acts to correct the error.

Since the conductivity of the standard resistor $R_1$ to which the flame conductivity is matched, is adjusted by means of gas-ratio selector knob 5, the flame conductivity can be adjusted to any desired value within the range of the rheostat $R_1$. Thus, any desired gas ratio can be selected and automatically maintained by properly setting the ratio selector.

The motor driven regulator panel 81 is usually located as closely as possible to the work head 27 in order to reduce the length of hose between the motor driven regulator 22 and the mixer 15. Gas stored in this hose 23 tends to lower the maximum speed of response, and, therefore, it is desirable to have such hose as short as possible.

The gas sampling head S also is mounted as closely as possible to the work head 27. However, this unit S is disposed away from the direct heat of the flames 28 and out of the direct path of the products of combustion—steam and smoke—resulting from the operation of the work head 27. The flash arrestors 56 and 58 are the type containing a filter disc. Thus the flash arrestor 56 acts to prevent "popping" of the mixed gases in the work head 27 from carbonizing the gas sampling tip insulating tube 57, while the flash arrestor 58 acts to prevent popping of the tip 50 from carbonizing such tube.

The pilot flame tip 45 on the gas sampling head S is connected to a suitable source of acetylene, and the needle valve 41 permits adjustment of the length of the pilot flame P. With a neutral flame F on the gas sampling tip 50, the pilot flame P should intersect the sampling flame F just beyond the inner cone of the sampling flame F.

If, during the operation of the unit, the oxygen supply fails, the motor-driven regulator will be driven in such a direction as to reduce the acetylene flow in an attempt to maintain the ratio. The upper limit switch 71 limits the upward travel of the regulator adjusting connection 73 so that the screw 110 will not be driven out of engagement with thread in the regulator cap 111.

If, during the operation of the system, the acetylene supply fails, or the acetylene is diluted because of incomplete generator or line purging, or a glowing carbon, particle forms on the end of the gas sampling tip 50, the motor-driven regulator 22 will be driven in such direction as to increase the acetylene flow in an attempt to maintain the ratio. The lower limit switch 72 limits the downward travel of the regulator adjusting screw 111 so that it will not be jammed down tight.

When either the upper or the lower limit switch is opened by overtravel of the regulator adjusting screw 110, the motor circuit 112 is opened, thus preventing further movement of the regulator adjusting screw 110, and the alarm circuit 113 is closed, thus warning the operator that an abnormal condition exists.

When the upper limit switch 71 is actuated, the unit C is rendered inoperative and will not return to automatic operation even though normal gas pressures are restored. In order to resume normal operation, the regulator adjusting screw must be returned to its normal operating range by throwing the manual-automatic switch 8 to the manual position, closing the high speed push-button switch 69, and then throwing the acetylene increase-decrease switch 65 to the increase position long enough to cause the motor 34 to drive the adjusting screw 110 back into its normal position. The unit C will then be ready to resume automatic operation. The circuit is purposely arranged so that it will be necessary to manually reset the unit C because it is believed that the operator should investigate any fluctuations or failure in the oxygen supply before resuming operations.

When the lower limit switch 72 is actuated because of failure or dilution of the acetylene supply, or because of a glowing carbon particle on the gas sampling tip 50, the unit E is rendered inoperative in the automatic position, but when normal conditions are restored, the unit E will return to automatic operation again. If necessary, the unit E can be operated manually without restoring normal conditions by depressing the high speed push-button switch 69 while making adjustments.

The pressure switch 24 on the motor-driven regulator panel 81 serves to render the automatic control operative each time the gases are turned on. It is operated by a bellows 114 is response to the pressure of the acetylene on the inlet side of the regulator 22. The pressure switch 24 can be adjusted to close at any desired inlet pressure. If it is adjusted close to the minimum usable gas inlet pressure, it will automatically stop the unit from operating whenever the pressure drops below the usable limit. However, if it is necessary to operate the unit while the pressure switch 24 is open, this can be done by closing the high speed push-button switch 69.

The motor 34 used to drive the regulator 22 is equipped with an eddy-current governor 115, like that shown in Geibig 2,228,625, having contacts 116 and its speed can be varied over a wide range. The maximum speed is a function of the various time delays in the gas system. Since these time delays will vary with each installation, this speed adjustment usually will be made in the field.

When the high speed push-button closing the switch 69 is depressed, the governor speed control is removed, by shorting resistor 117 in the circuit 118 from the motor 34 which drives the regulator 22 and causes the motor to run at full speed. The use of this high speed control switch 69 permits rapid adjustment of the regulator 22 when putting the equipment into operation.

The system will not operate when either the upper or the lower limit switch is actuated or when the acetylene pressure switch 24 is open. Since the high speed push-button switch 69 shunts these switches, the unit E can be made to operate in either the manual or the automatic position by closing the high speed switch 69.

In many production setups it is sometimes necessary to make frequent changes in the apparatus and gas conditions to accommodate the various batches of work being processed by the machine. With the conventional method it is usually necessary to experiment with the gas flows each time the setup is changed in order to secure the desired performance. The invention provides a highly accurate means of repeating precisely, the flame conditions which were previously found to be satisfactory, without the necessity of experimenting each time a setup is made.

In order to successfully carry out some processes it is necessary to use and accurately maintain some certain gas ratio. A calibrated gas ratio control unit is provided so that an operator can secure any desired gas ratio by properly setting the ratio knob of the control unit. The efficiency of many processes can be increased by using an oxidizing flame instead of a neutral flame but in the past the use of an oxidizing ratio has been avoided because of the difficulty of accurately adjusting the gases to a specific oxidizing ratio. This invention provides reliable and accurate means for obtaining and maintaining any desired oxidizing ratio.

For many processes it is theoretically possible to secure greater efficiency or a better product either by suitably varying the heat input throughout the process cycle while maintaining the gas ratio constant, or by varying the gas ratio in a suitable manner throughout the process cycle. In practice, program heating of this nature has seldom been attempted because of the difficulty of following and repeating any given heat program. The gas ratio control system of the present invention provides ready and accurate means for setting up and repeating any such program. Furthermore, the system can be arranged to follow any desired program automatically without any attention on the part of the operator.

There are situations where neither an accurate setting of the gas ratio nor accurate control of the heat input is required. In such cases the gas ratio system of the present invention permits the use of the minimum volume of gases and it avoids drifting, thus making possible an appreciable saving in gases.

From the above it is evident that the invention provides closer control of flame conditions than has been possible in the past and that the maintenance of the proper conditions will no longer be dependent on the operator's judgment and skill. Furthermore, it should enable an operator to turn out more uniform work with less spoilage since flame conditions can be maintained constant at all times.

The electrical circuit of the present invention includes a Wheatstone bridge X with the addition of a number of important improvements and critical refinements. For example: The meter 32 is connected in series with the flame detector FP to measure the flame current so that the electronic unit E will not only control the oxy-fuel gas ratio but also indicate such ratio.

The "manual-automatic" switch 8 is provided so that the electronic unit E can function as an automatic gas ratio control or the gas ratio can be controlled manually by means of an "acetylene increase-decrease" switch 65.

Acetylene "increase" and "decrease" panel lights 6 and 7 are provided to indicate when an automatic ratio correction is being made, and, if so, in what direction the correction is being made. Such panel lights 6 and 7 also assist in making the proper bias adjustment of the battery 98.

The gas pressure switch 24 is responsive to the acetylene line pressure and prevents the electronic unit E from operating in the "automatic" position when the acetylene is turned off. If such pressure switch 24 is not in the circuit, the electronic unit will try to cut down the acetylene flow setting by screwing out the acetylene regulator 22 when the gases are turned off.

The motor 34 which drives the acetylene regulator 22 is equipped with the adjustable governor 115, so that the speed of correction can be set to suit the conditions of any particular setup.

The motor-driven acetylene regulator 22 is equipped with the arm 74 controlling the "upper limit switch" 71 to prevent the adjustment connection 73 from being driven out of engagement, and the "lower limit switch" 72 to prevent the adjustment connection 73 from being jammed down tight. When either one of such limit switches is actuated, the automatic control circuit is rendered inoperative and thus prevents overtravel of the adjustment connection. When either limit switch is actuated an alarm device such as the bell 75 or light is energized, thus warning the operator of an abnormal condition.

The lower limit switch 72 is automatically actuated if: The acetylene pressure drops below the minimum pressure required to obtain the desired gas flow. The acetylene is diluted with air. A glowing particle of carbon forms on the gas sampling tip. In any case the unit will resume automatic operation as soon as normal conditions are restored.

The upper limit switch 71 is automatically actuated in the event of failure of the oxygen supply. The circuit is arranged so that regulator 22 must be restored to the normal operating range by the manual switch 8 before the system will resume automatic operation. However, if desired, the circuit can be arranged so that it resumes automatic operation as soon as the oxygen pressure is restored.

The "high speed" push-button switch 69 which shorts out the governor contacts 116, is provided so that manual or automatic adjustments can be made at full motor speed, if desired. Since such switch 69 also shorts out the upper and lower limit switches 71 and 72 and the pressure switch 24, as well as the governor contacts 116, the system will operate regardless of whether or not the limit switches or the pressure switches are actuated when such switch 69 is closed.

The oxygen or the fuel gas can be automatically controlled when the other gas is maintained constant. In actual practice, however, it has been found that the most satisfactory arrangement is to automatically control the flow of the acetylene while the oxygen flow remains constant. This is done for the following reason:

With the apparatus available and the usual field conditions, it is easier to maintain a constant oxygen flow than it is to maintain a constant acetylene flow. Oxygen flow can be measured quite accurately and the flow maintained within close limits by means of the calibrated critical flow orifice meter 14. There is no simple means for accurately maintaining or measuring the flow of acetylene and its flow can and does vary. Therefore, it is best to apply the automatic control to the gas which is most likely to vary since this method will introduce the least variation in the process conditions.

When means is thus provided for maintaining a constant oxygen flow, the system provides highly accurate means for obtaining heat control since the heat delivered to the work is a function of the two gas flows. Experience indicates that use of the gas ratio control system as a heat control device is industrially important.

I claim:

1. An oxy-fuel gas ratio control system comprising, in combination, an oxygen supply line containing an adjustable pressure regulator and a critical orifice meter with pressure gauges each side thereof following the regulator for measuring and maintaining substantially constant a desired flow of oxygen, an acetylene supply line containing a pressure regulator having a diaphragm spring, an oxy-acetylene mixer connected to said oxygen and acetylene supply lines, a work flame burner connected to an outlet of said mixer, a gas sampling unit having an oxy-acetylene mixed-gas flame tip connected to said work flame burner, an air-acetylene pilot flame burner insulated from said tip and positioned so that the pilot flame contacts the mixed-gas flame, a control unit having an input circuit containing said burner and tip, and means comprising a motor operatively connected to said control unit to automatically adjust said acetylene pressure regulator spring to maintain constant a desired oxy-acetylene ratio.

2. In an oxy-fuel gas ratio system as defined by claim 1, quick-acting valves in said oxygen and acetylene supply lines coupled together so that the acetylene valve opens ahead of the oxygen valve and closes after the oxygen valve.

3. In an oxy-fuel gas ratio control system, a control unit comprising an input circuit consisting of an air-acetylene pilot flame burner, a mixed oxygen-acetylene flame tip and an ammeter in series with flames from said burner and tip, a current matching circuit containing an adjustable resistor, a Wheatstone bridge including two arms consisting of fixed resistors, said input circuit and current matching circuit constituting the other two arms of said bridge, a constant voltage direct current supply circuit connected to the bridge, and means responsive to any unbalance in the bridge circuit to maintain a selected ratio of the gases supplied to the mixed flame tip, said ammeter serving to indicate the desired ratio of oxygen to acetylene selected through the adjustment of the resistor in the current matching circuit.

4. In an oxy-fuel gas ratio control system, a control unit comprising separate supply lines, one being connected to a source of combustion supporting gas and another connected to a source of fuel gas, respectively, means for mixing such gases, pressure regulated means in the combustion supporting gas supply line controlling the flow of combustion supporting gas, a critical orifice meter in the combustion supporting gas supply line with gauges calibrated to indicate the rate of combustion supporting gas flow, and said regulator means being adapted to maintain such flow substantially constant, and flame resistance means responsive to the ratio of such gases for controlling the flow of the fuel gas through the fuel gas supply line for maintaining a constant ratio between the combustion supporting gas and the fuel gas supplied by said lines to said mixer.

5. In a gas ratio control system for a combustible gas mixture comprising a flame nozzle, means for supplying a mixture of a combustible gas and an oxidizing gas to said nozzle, means adjacent said nozzle for mixing said gases, a separate supply line for each gas to said mixing means, a pressure responsive regulator in each supply line, and means responsive to the resistance of a flame supported by said mixture for controlling the ratio of fuel gas to oxidizing gas, the combination therewith of the improvement for enhancing the sensitivity of said controlling means and lessening its tendency to hunt, said improvement including one of said regulators having a diaphragm, a valve responsive to flexure of said diaphragm, means for supplying the outlet pressure of one of said gases to said diaphragm, a spring opposing such flexure of said diaphragm, means for adjusting the stress in said spring, reversible motor means for said spring adjusting means to adjust the stress upon said diaphragm spring, the supply of gas through the other regulator being substantially constant, and means responsive to the electrical resistance of a flame supported by said mixture for actuating said motor means to control the stress in said diaphragm spring and maintain said ratio of fuel to oxidizing gases substantially constant.

6. A gas ratio control system according to claim 5 in which oxygen is the oxidizing gas and acetylene is the fuel gas and the oxygen flow is maintained constant while the flow of acetylene is varied as described.

7. A gas ratio control system according to claim 5 in which said flame resistance responsive means includes a positive electrode constituted by a flame from a burner angularly disposed with respect to a burner and flame of said flame resistance responsive means and intersecting the last mentioned flame.

References Cited in the file of this patent

UNITED STATES PATENTS

| | | |
|---|---|---|
| 1,762,133 | Harris | June 3, 1930 |
| 1,874,640 | Seeger | Aug. 30, 1932 |
| 1,949,736 | Bristol | Mar. 6, 1934 |
| 2,201,385 | Woodson | May 21, 1940 |
| 2,324,821 | Campbell | July 20, 1943 |
| 2,349,521 | Schmidt | May 23, 1944 |
| 2,361,294 | Jones | Oct. 24, 1944 |
| 2,368,937 | McGillin | Feb. 6, 1945 |